United States Patent
Conley et al.

(10) Patent No.: US 7,173,863 B2
(45) Date of Patent: Feb. 6, 2007

(54) FLASH CONTROLLER CACHE ARCHITECTURE

(75) Inventors: Kevin M. Conley, San Jose, CA (US); Reuven Elhamias, Kfar-Vradim (IL)

(73) Assignee: SanDisk Corporation, Milpitas, CA (US)

( * ) Notice: Subject to any disclaimer, the term of this patent is extended or adjusted under 35 U.S.C. 154(b) by 221 days.

(21) Appl. No.: 10/796,575

(22) Filed: Mar. 8, 2004

(65) Prior Publication Data

US 2005/0195635 A1    Sep. 8, 2005

(51) Int. Cl.
  *G11C 7/00* (2006.01)
(52) U.S. Cl. .................... 365/189.05; 365/189.04; 365/221
(58) Field of Classification Search ........... 365/189.05, 365/189.04, 221
See application file for complete search history.

(56) References Cited

U.S. PATENT DOCUMENTS

| | | | |
|---|---|---|---|
| 4,725,945 A | 2/1988 | Kronstadt et al. | |
| 5,043,940 A | 8/1991 | Harari | |
| 5,070,032 A | 12/1991 | Yuan et al. | |
| 5,095,344 A | 3/1992 | Harari | |
| 5,172,338 A | 12/1992 | Mehrotra et al. | 365/185 |
| 5,200,959 A | 4/1993 | Gross et al. | 371/21.6 |
| 5,270,979 A | 12/1993 | Harari et al. | 365/218 |
| 5,297,148 A | 3/1994 | Harari et al. | 371/10.2 |
| 5,313,421 A | 5/1994 | Guterman et al. | |
| 5,315,541 A | 5/1994 | Harari et al. | 365/63 |
| 5,343,063 A | 8/1994 | Yuan et al. | |
| 5,359,569 A | 10/1994 | Fugita et al. | 365/229 |
| 5,418,752 A | 5/1995 | Harari et al. | |
| 5,428,621 A | 6/1995 | Mehrotra et al. | 371/21.4 |
| 5,430,859 A | 7/1995 | Norman et al. | 395/425 |
| 5,532,962 A | 7/1996 | Auclair et al. | 365/201 |
| 5,570,315 A | 10/1996 | Tanaka et al. | |
| 5,602,987 A | 2/1997 | Harari et al. | 395/182.06 |
| 5,606,532 A | 2/1997 | Lambrache | 365/238.5 |
| 5,661,053 A | 8/1997 | Yuan | |
| 5,663,901 A | 9/1997 | Wallace et al. | 365/52 |
| 5,677,872 A | 10/1997 | Samachisa et al. | |
| 5,712,179 A | 1/1998 | Yuan | |

(Continued)

FOREIGN PATENT DOCUMENTS

EP    0557968 A    9/1993

(Continued)

OTHER PUBLICATIONS

ISA/EPO, "Notification of Transmittal of the International Search Report and the Written Opinion of the International Searching Authority, or the Declaration", mailed in related Appl. No. PCT/US2005/007313 on Sep. 15, 2005, 19 pages.

(Continued)

*Primary Examiner*—Tuan T. Nguyen
(74) *Attorney, Agent, or Firm*—Parsons Hsue & de Runtz LLP

(57) ABSTRACT

A buffer cache interposed between a non-volatile memory and a host may be partitioned into segments that may operate with different policies. Cache policies include write-through, write and read-look-ahead. Write-through and write back policies may improve speed. Read-look-ahead cache allows more efficient use of the bus between the buffer cache and non-volatile memory. A session command allows data to be maintained in volatile memory by guaranteeing against power loss.

15 Claims, 11 Drawing Sheets

U.S. PATENT DOCUMENTS

| | | | |
|---|---|---|---|
| 5,712,180 A | 1/1998 | Guterman et al. | 437/43 |
| 5,726,937 A | 3/1998 | Beard | 365/185.33 |
| 5,765,185 A | 6/1998 | Lambrache et al. | |
| 5,774,397 A | 6/1998 | Endoh et al. | |
| 5,798,968 A | 8/1998 | Lee et al. | 365/185.29 |
| 5,890,192 A | 3/1999 | Lee et al. | 711/103 |
| 5,909,449 A | 6/1999 | So | |
| 5,930,167 A | 7/1999 | Lee et al. | |
| 5,937,423 A | 8/1999 | Robinson | 711/103 |
| 5,966,734 A | 10/1999 | Mohamed et al. | 711/173 |
| 6,000,006 A | 12/1999 | Bruce et al. | 711/103 |
| 6,026,027 A | 2/2000 | Terrell, II et al. | |
| 6,046,935 A | 4/2000 | Takeuchi et al. | |
| 6,151,248 A | 11/2000 | Harari et al. | 365/185.14 |
| 6,222,762 B1 | 4/2001 | Guterman et al. | 365/185.03 |
| 6,249,841 B1 | 6/2001 | Sikes et al. | |
| 6,263,398 B1 | 7/2001 | Taylor et al. | 711/3 |
| 6,349,056 B1 | 2/2002 | Conley et al. | 365/185.04 |
| 6,349,363 B2 | 2/2002 | Cai et al. | 711/129 |
| 6,426,893 B1 | 7/2002 | Conley et al. | 365/185.11 |
| 6,434,669 B1 | 8/2002 | Arimilli et al. | 711/128 |
| 6,456,528 B1 | 9/2002 | Chen | |
| 6,470,422 B2 | 10/2002 | Cai et al. | 711/129 |
| 6,510,495 B1 | 1/2003 | Nobukiyo | |
| 6,522,580 B2 | 2/2003 | Chen et al. | |
| 6,523,132 B1 | 2/2003 | Harari et al. | 714/8 |
| 6,560,143 B2 | 5/2003 | Conley et al. | 365/185.04 |
| 6,647,499 B1 | 11/2003 | Morcom | 713/300 |
| 6,717,847 B2 | 4/2004 | Chen | |
| 6,721,843 B1 | 4/2004 | Estakhri | |
| 6,735,661 B2 | 5/2004 | Gelke et al. | |
| 6,763,424 B2 | 7/2004 | Conley | |
| 6,791,877 B2 | 9/2004 | Miura et al. | |
| 6,798,353 B2 | 9/2004 | Seal et al. | |
| 6,925,007 B2 | 8/2005 | Harari et al. | |
| 6,941,412 B2* | 9/2005 | Gongwer et al. | 365/202 |
| 6,941,414 B2 | 9/2005 | Hsu et al. | |
| 6,968,421 B2 | 11/2005 | Conley | |
| 2001/0025333 A1 | 9/2001 | Taylor et al. | |
| 2001/0052060 A1 | 12/2001 | Bao | |
| 2001/0053091 A1 | 12/2001 | Futatsuya et al. | 365/185.11 |
| 2002/0099904 A1 | 7/2002 | Conley | 711/103 |
| 2005/0257120 A1* | 11/2005 | Gorobets et al. | 714/763 |
| 2005/0268025 A1* | 12/2005 | Smith et al. | 711/103 |

FOREIGN PATENT DOCUMENTS

| | | | |
|---|---|---|---|
| EP | 0566306 A | 10/1993 | |
| WO | WO02/05285 A2 | 1/2002 | |
| WO | WO 02/058074 | 1/2002 | |

OTHER PUBLICATIONS

ISA/EPO, "Communication Relating to the Results of the Partial International Search, Invitation to Pay Additional Fees," mailed in related Appl. No. PCT/US2005/007313 on May 7, 2005, 5 pages.

Imamiya, K. et al., A 125-mm$^2$ 1 Gb NAND Flash Memory With 10-Mbytes/s Program Speed, 2002 IEEE.

* cited by examiner

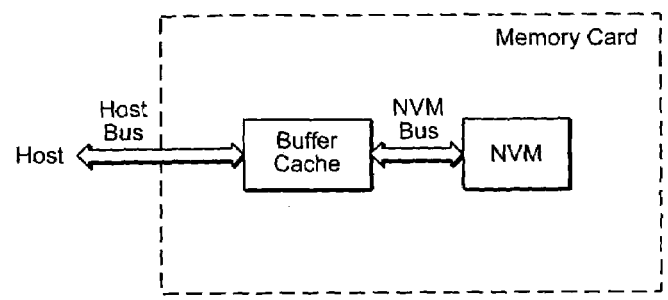
FIG._1 (PRIOR ART)
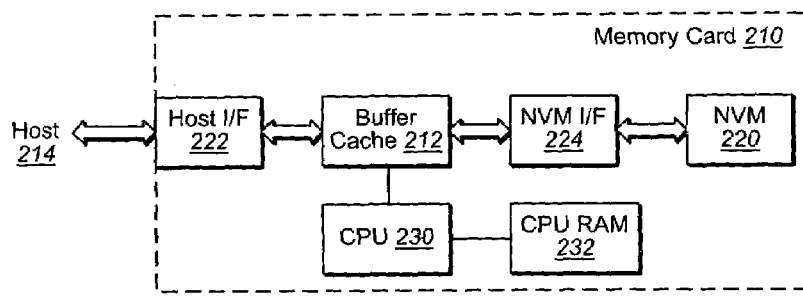
FIG._2
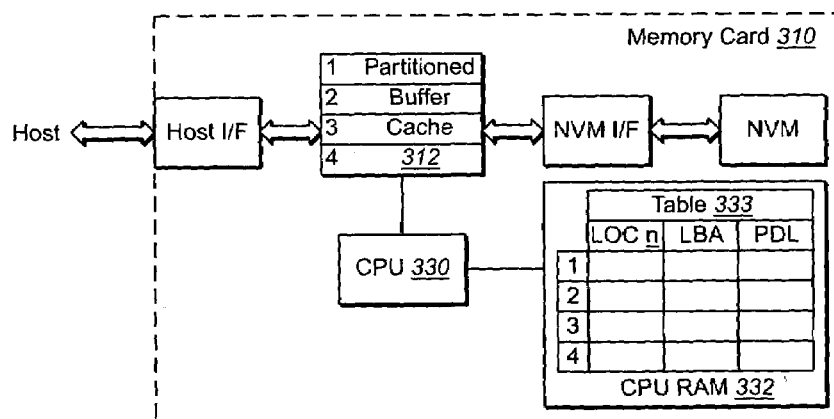
FIG._3

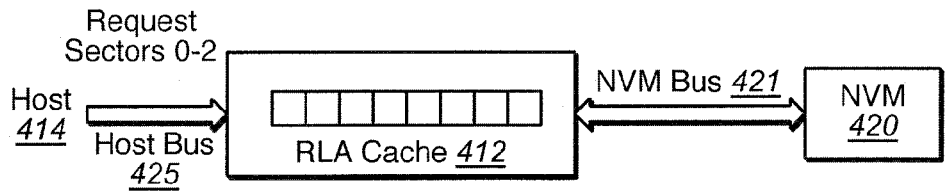
FIG._4A
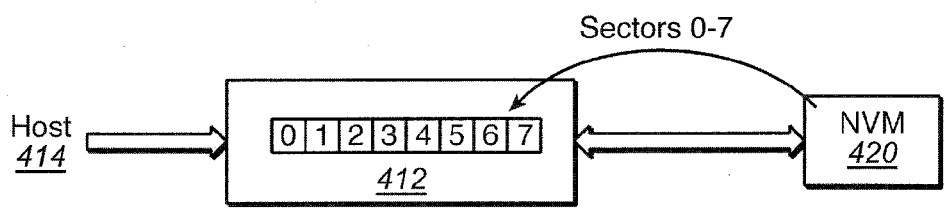
FIG._4B
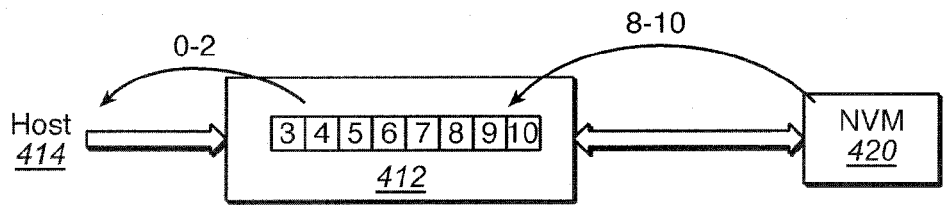
FIG._4C
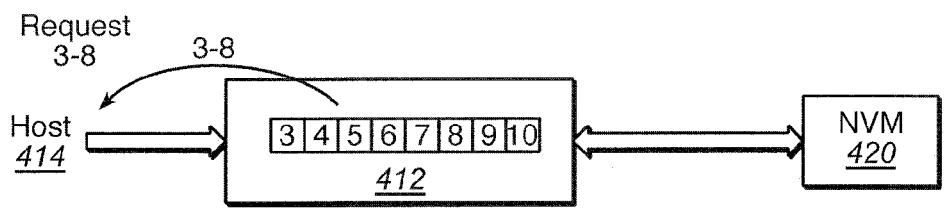
FIG._4D

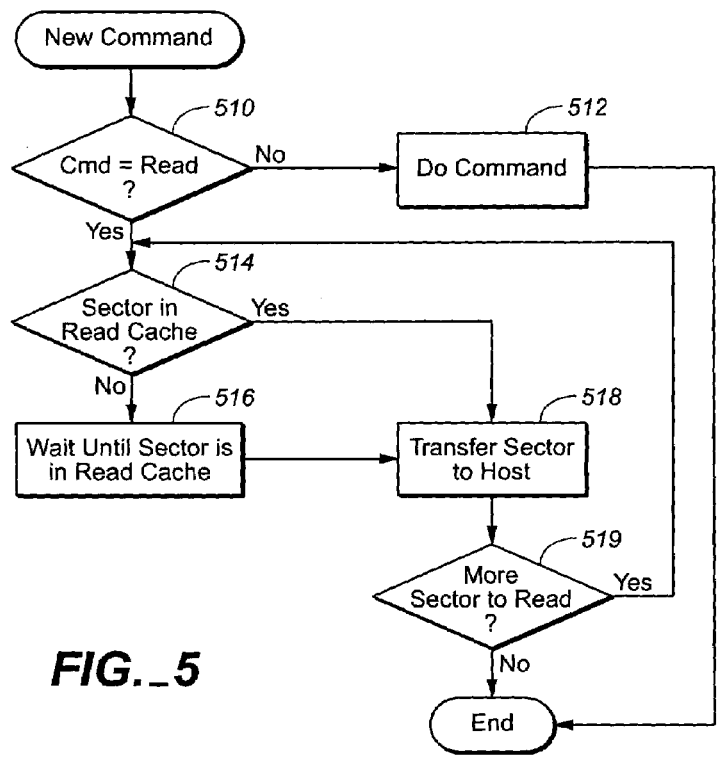
FIG._5
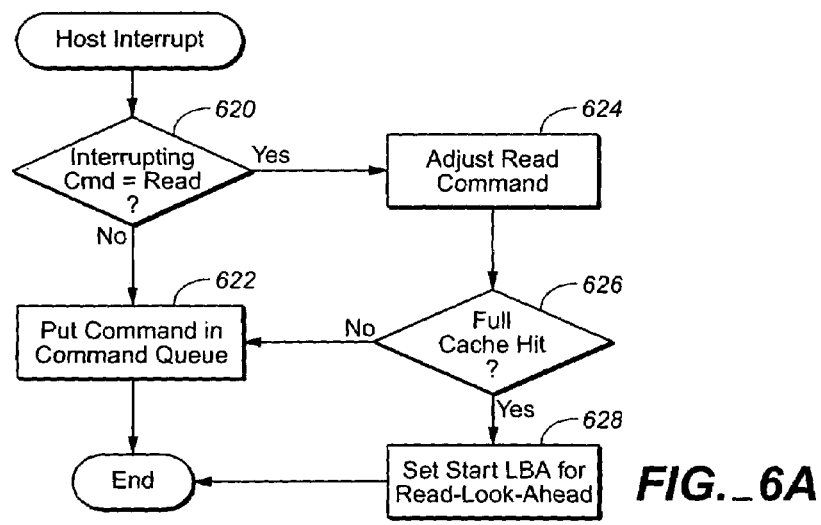
FIG._6A

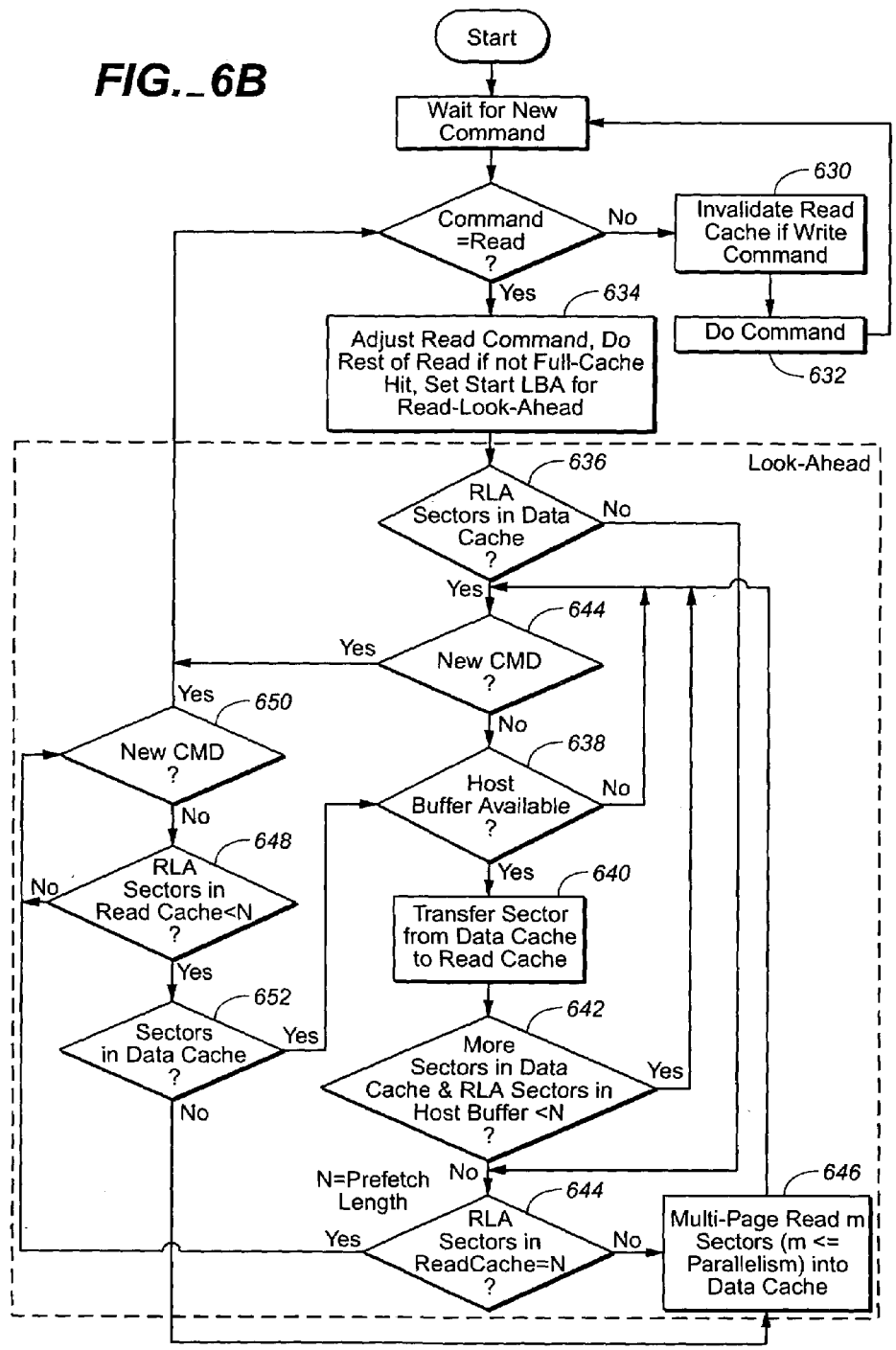
FIG._6B

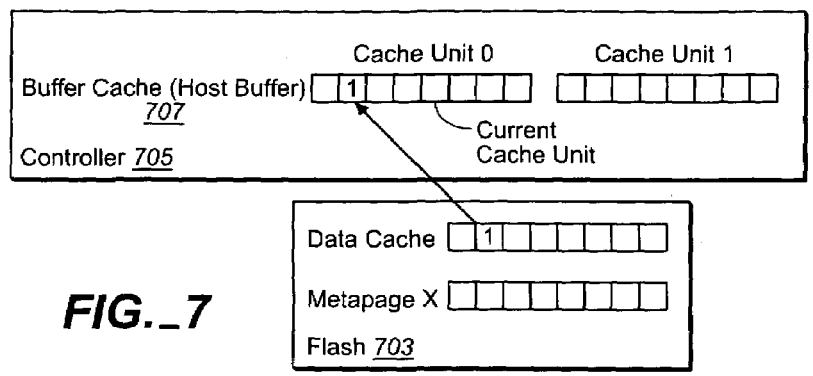
FIG._7
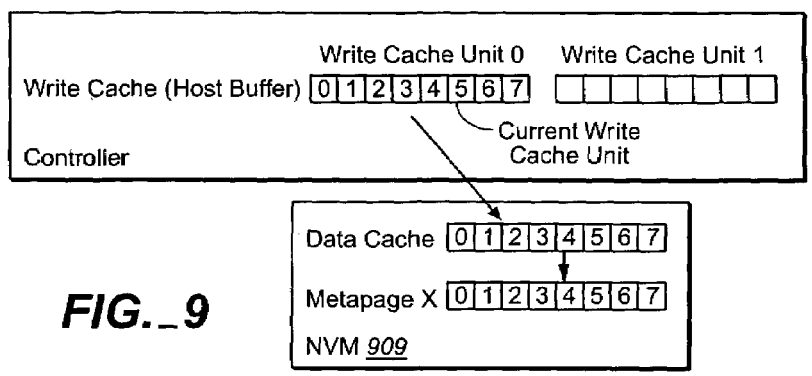
FIG._9

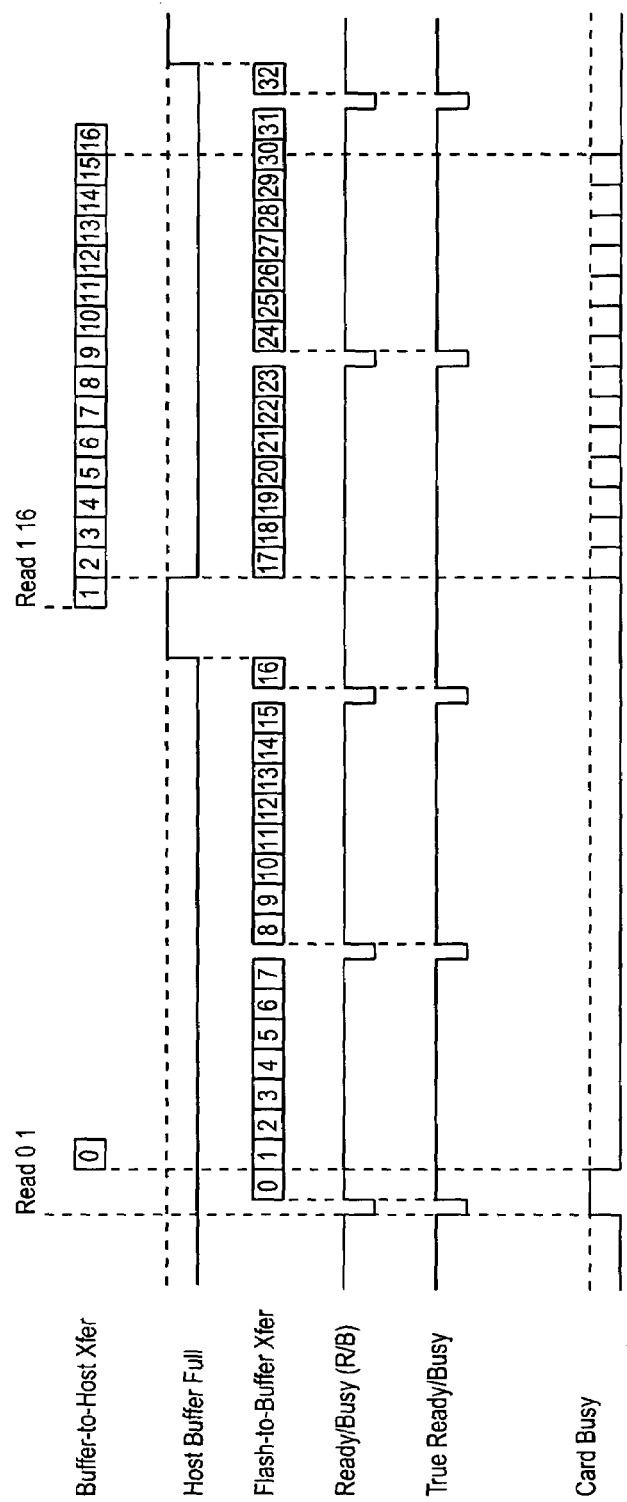
FIG._8A

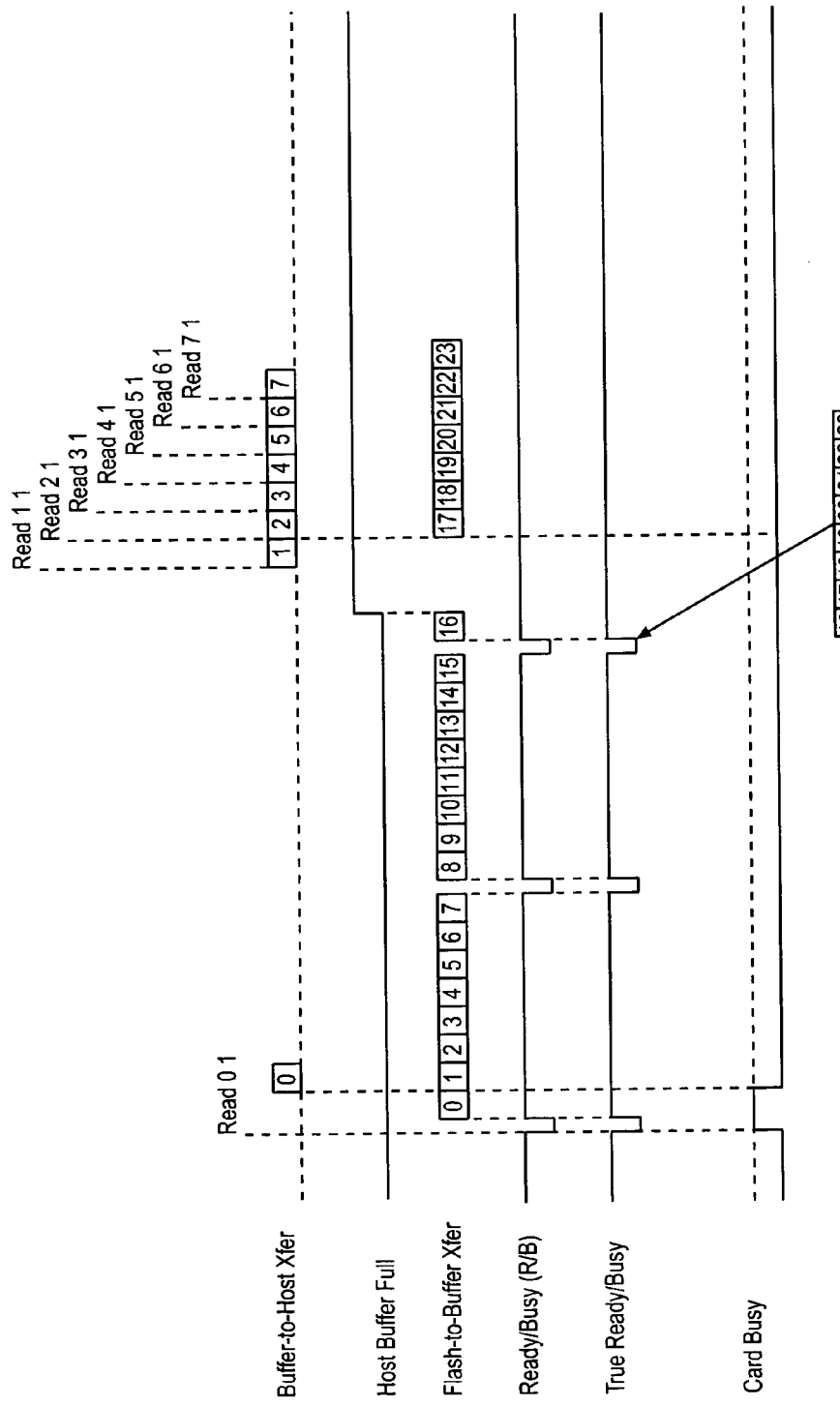

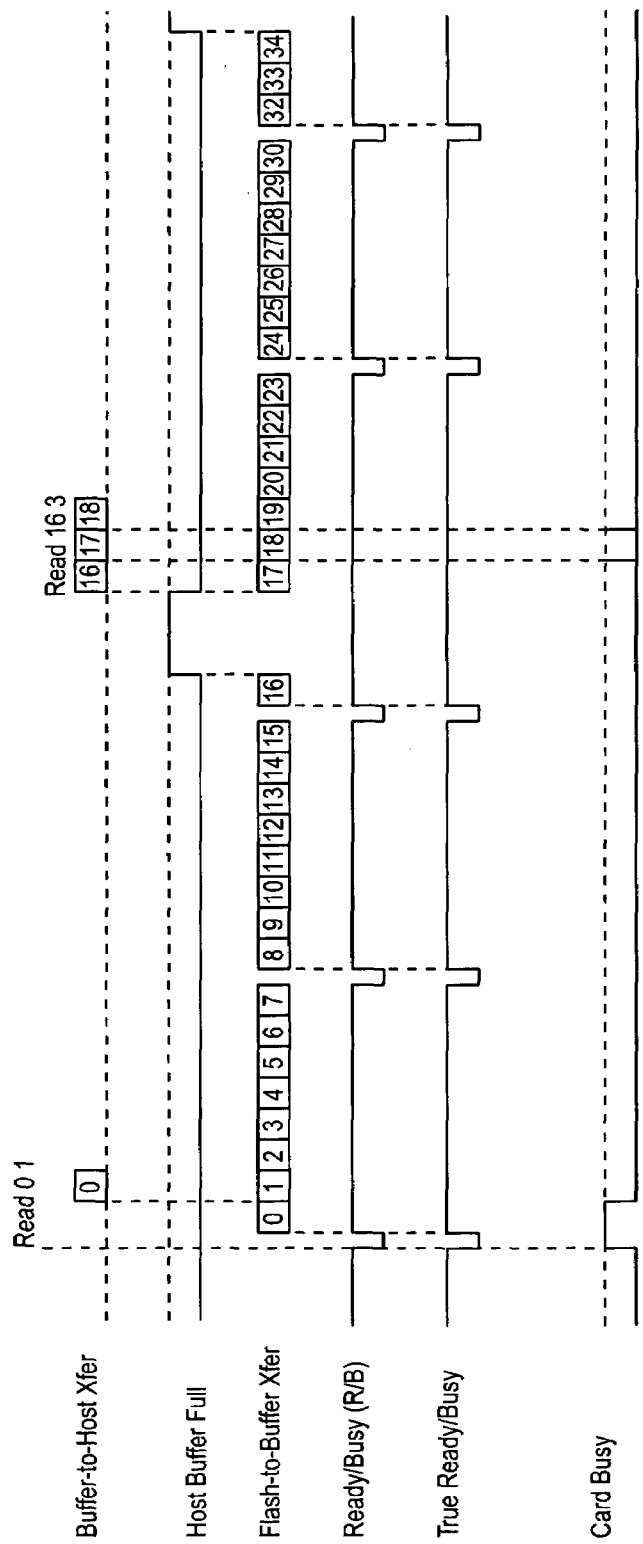
FIG._8C

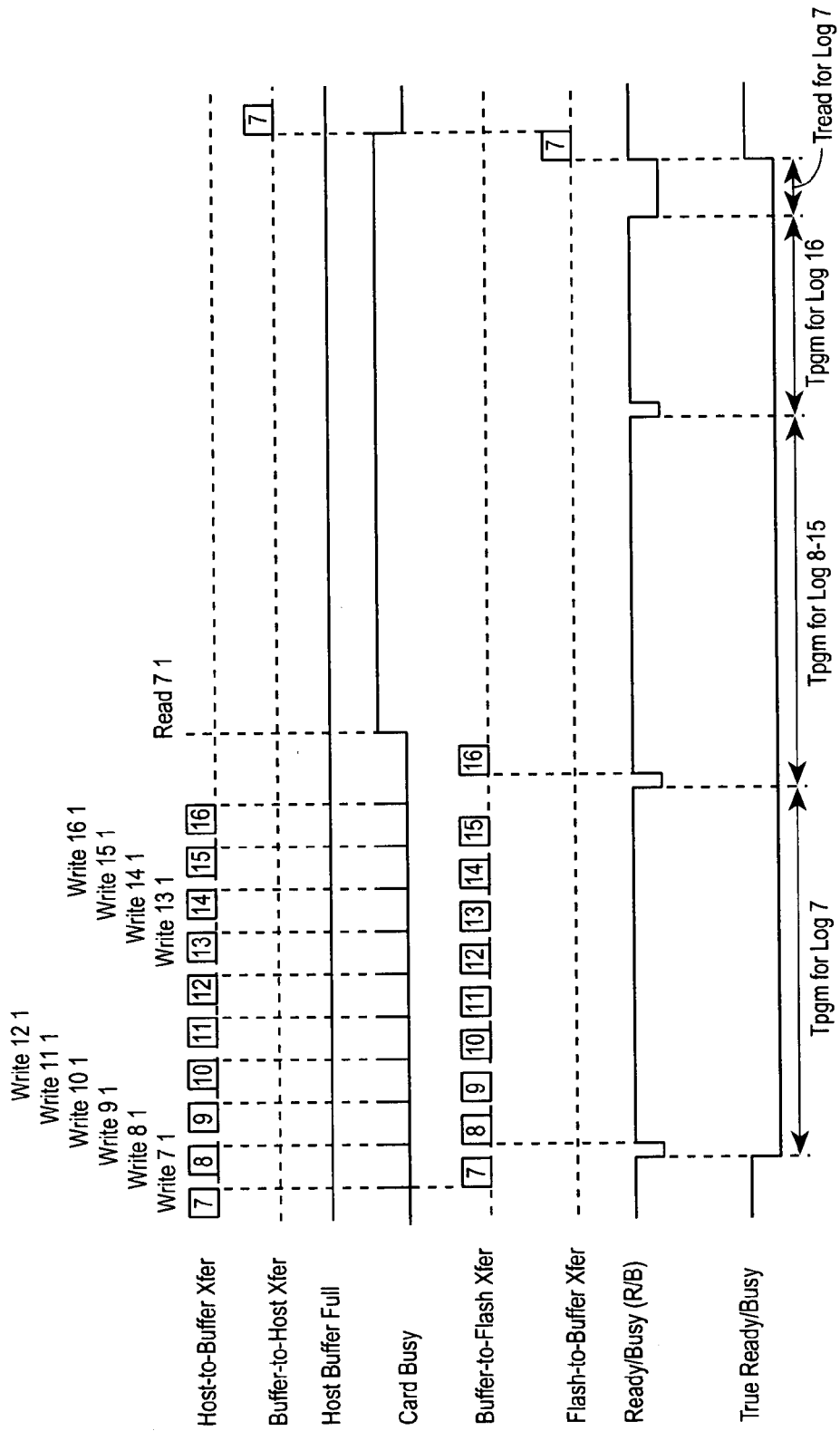
FIG._10

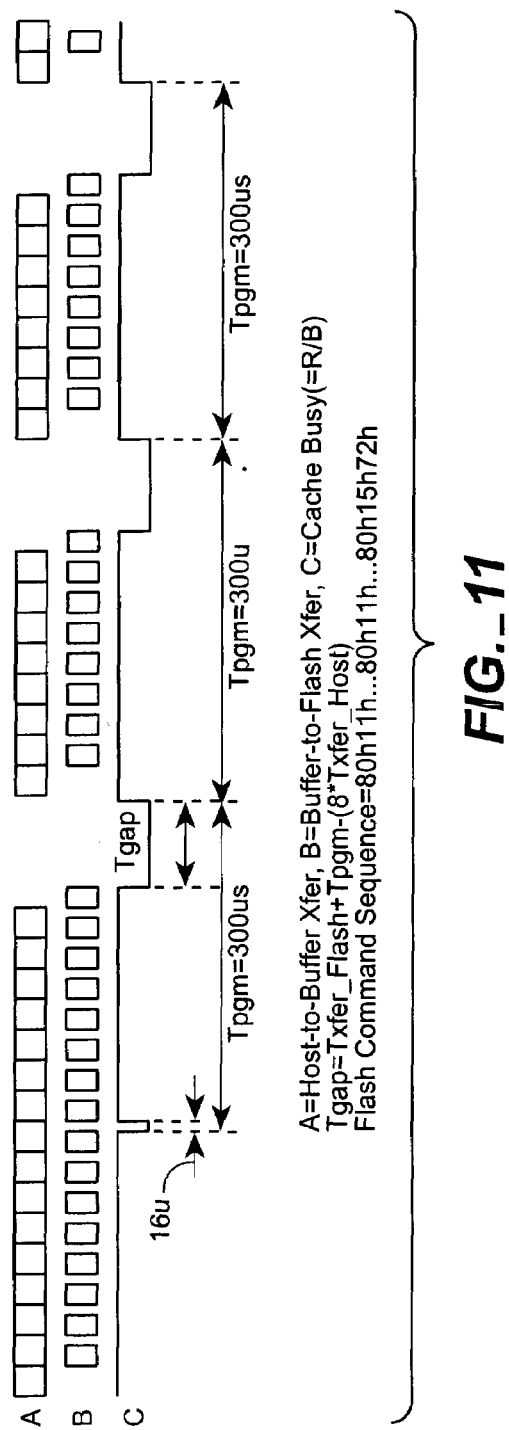
FIG._11

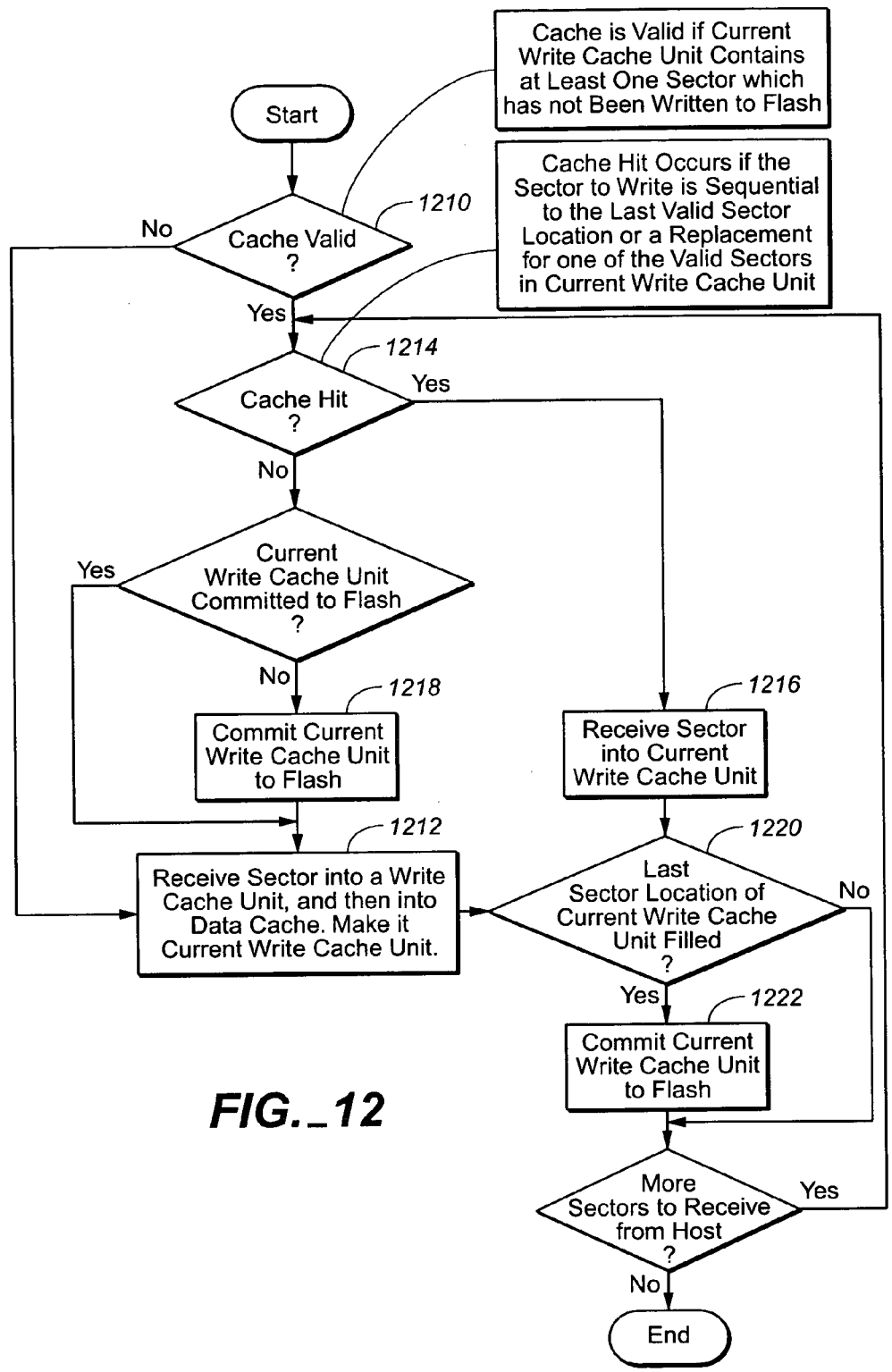
FIG._12

FLASH CONTROLLER CACHE ARCHITECTURE

BACKGROUND

This invention relates to semiconductor electrically erasable programmable read only memories (EEPROM) and specifically to a controller cache system for removable memory cards using EEPROM or other, similar memories.

Flash EEPROM systems are being applied to a number of applications, particularly when packaged in an enclosed card that is removably connected with a host system. Some of the commercially available cards are CompactFlash™ (CF) cards, MultiMedia cards (MMC), Secure Digital (SD) cards, Smart Media cards, personnel tags (P-Tag) and Memory Stick cards. One supplier of these cards is SanDisk Corporation, assignee of this application. Host systems with which such cards are used include personal computers, notebook computers, hand held computing devices, cameras, audio reproducing devices, and the like. Flash EEPROM systems are also utilized as bulk mass storage embedded in host systems.

Such non-volatile memory systems include an array of floating-gate memory cells and a system controller. The controller manages communication with the host system and operation of the memory cell array to store and retrieve user data. The memory cells are grouped together into blocks of cells, a block of cells being the smallest grouping of cells that are simultaneously erasable. Prior to writing data into one or more blocks of cells, those blocks of cells are erased. User data are typically transferred between the host and memory array in sectors. A sector of user data can be any amount that is convenient to handle, preferably less than the capacity of the memory block, often being equal to the standard disk drive sector size, 512 bytes. In one commercial architecture, the memory system block is sized to store one sector of user data plus overhead data, the overhead data including information such as an error correction code (ECC) for the user data stored in the block, a history of use of the block, defects and other physical information of the memory cell block. Various implementations of this type of non-volatile memory system are described in the following United States patents and pending applications assigned to SanDisk Corporation, each of which is incorporated herein in its entirety by this reference: U.S. Pat. Nos. 5,172,338, 5,602,987, 5,315,541, 5,200,959, 5,270,979, 5,428,621, 5,663,901, 5,532,962, 5,430,859 and 5,712,180, 6,222,762 and 6,151,248. Another type of non-volatile memory system utilizes a larger memory cell block size that stores multiple sectors of user data.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips.

One architecture of the memory cell array conveniently forms a block from one or two rows of memory cells that are within a sub-array or other unit of cells and which share a common erase gate. Although it is currently common to store one bit of data in each floating gate cell by defining only two programmed threshold levels, the trend is to store more than one bit of data in each cell by establishing more than two floating-gate transistor threshold ranges. A memory system that stores two bits of data per floating gate (four threshold level ranges or states) is currently available. Of course, the number of memory cells required to store a sector of data goes down as the number of bits stored in each cell goes up. This trend, combined with a scaling of the array resulting from improvements in cell structure and general semiconductor processing, makes it practical to form a memory cell block in a segmented portion of a row of cells. The block structure can also be formed to enable selection of operation of each of the memory cells in two states (one data bit per cell) or in some multiple such as four states (two data bits per cell).

Since the programming of data into floating-gate memory cells can take significant amounts of time, a large number of memory cells in a row are typically programmed at the same time. But increases in this parallelism cause increased power requirements and potential disturbances of charges of adjacent cells or interaction between them. U.S. Pat. No. 5,890,192 of SanDisk Corporation, which is incorporated herein in its entirety, describes a system that minimizes these effects by simultaneously programming multiple chunks of data into different blocks of cells located in different operational memory cell units (sub-arrays).

To further efficiently manage the memory, blocks may be linked together to form virtual blocks or metablocks. That is, each metablock is defined to include one block from each plane. Use of the metablock is described in international patent application publication No. WO 02/058074, which is incorporated herein in its entirety. The metablock is identified by a host logical block address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNS) within the memory cell array. Individual pages within the blocks are typically identified by offsets within the block address. A metapage is a unit of programming of data in a metablock. A metapage is comprised of one page from each of the blocks of the metablock.

Due to the difference in size between a sector (512 bytes) and an erase block or metablock (sometimes more than 128 sectors), it is sometimes necessary to copy from one erase block, or metablock, to another. Such an operation is referred to as garbage collection. Garbage collection operations reduce the write performance of a memory system. For example, where some sectors in a metablock are updated, but other sectors in the metablock are not, the updated sectors may be written to a new metablock. The sectors that are not updated may be copied to the new metablock, either immediately or at some later time as part of garbage collection.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the physical blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes blocks from multiple planes, typically the same number of blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

A memory array generally has circuitry connected to the array for reading data from and writing data to the memory array. As part of this circuitry, a data cache may be connected to the memory array. A data cache may simply be a row of registers that may be used to transfer data to and from the memory array. A data cache may hold as much data as a row of the memory array. Typically, a data cache is formed on the same chip as the memory array.

A controller may have several components including a central processing unit (CPU), a buffer cache (buffer RAM) and a CPU RAM. Both buffer RAM and CPU RAM may be SRAM memories. These components may be on the same chip or on separate chips. The CPU is a microprocessor that runs software (firmware) to carry out operations including transferring data to and from the memory array. The buffer cache may be used to hold data prior to writing to the memory array or prior to sending the data to the host. Thus, the buffer cache is a dual access memory that can simultaneously service the flash and host operations. The CPU RAM may be used to store data needed by the CPU such as instructions or addresses of data in the buffer cache or in the memory array. In one example shown in U.S. Pat. No. 5,297,148, which is incorporated herein in its entirety, a buffer cache may be used as a write cache to reduce wear on a flash EEPROM that is used as non-volatile memory.

FIG. 1 shows a buffer cache interposed between a host and a non-volatile memory (NVM) in a removable memory card. The buffer cache is connected to the host by a host bus. The buffer cache is connected to the NVM by an NVM bus. The bandwith of the host bus is greater than that of the NVM bus so that the NVM bus becomes a bottleneck for data being transferred between the host and the NVM. Also, programming within the NVM may become a bottleneck, especially when the host writes single sectors of data. After a single-sector write, the controller waits for the NVM to complete the write operation before accepting another sector from the host. Write or read operations involving small numbers of sectors may be inefficient where parallelism allows greater numbers of sectors to be handled. Where a host executes multiple threads, multiple data streams are generated that may be handled sequentially by a memory card controller.

Thus, a memory controller is needed that improves efficiency of read and write operations involving small amounts of data in an NVM.

SUMMARY

A memory controller includes a buffer cache that may be partitioned into segments thus forming a multi-segment cache. Different segments may have different policies allowing separate operations using the buffer cache to be carried out at the same time. The size of a segment may be changed according to the operation using that segment.

Various policies may be applied in either a single segment cache or a multi-segment cache. Policies include read-look-ahead (or prefetch) cache that stores additional data when a read is performed. The additional data is identified as being data that the host is likely to request in a subsequent command. The additional data may simply be the next sequential data in the memory array. A write-through cache policy stores data in buffer cache and subsequently writes the data to the memory array, without modifying the data. A write-back cache policy stores data in buffer cache and may modify the data in buffer cache without writing the data to the memory array. In addition, a CPU may store data in a buffer cache where the data is needed by the CPU. This may include data that would normally be stored in CPU RAM A buffer cache is generally a non-volatile memory, so data that is only stored in buffer cache may be lost if there is a loss of power to the memory system. Loss of power is a particular concern for removable memory cards. Certain operations, including caching operations, garbage collection and address translation information updates may store data in volatile memory only. A guarantee of power by a host may allow such operations to be carried out as background operations. A session command may be sent by a host to a memory card as a guarantee of power for a period of time.

BRIEF DESCRIPTION OF THE DRAWINGS

FIG. 1 shows a prior art memory card;

FIG. 2 shows a memory card having a buffer cache in which aspects of the present invention may be implemented;

FIG. 3 shows a memory card having a partitioned buffer cache;

FIGS. 4A–4D show an implementation of read-look-ahead cache;

FIG. 5 shows a host command handling process for a read-look-ahead implementation;

FIGS. 6A–6B show a flash access management process for a read-look ahead implementation;

FIG. 7 shows an example of a buffer cache having two cache units and a flash memory having a metapage that is the same size as the cache units;

FIG. 8A shows an example of read-look-ahead cache operation where data is sent from buffer cache to a host as a result of a cache hit;

FIG. 8B shows another example of read-look-ahead cache operation where data is sent from buffer cache to a host as a result of a cache hit;

FIG. 8C shows an example of read-look-ahead cache operation where data is sent from buffer cache to a host as a result of a partial cache hit;

FIG. 9 shows an example of using buffer cache as a write cache;

FIG. 10 shows an example of the operation of a write-through cache;

FIG. 11 shows an example of pipelining of data from the host to buffer cache and from buffer cache to NVM;

FIG. 12 is a flowchart for operation of a write-back cache operation.

DETAILED DESCRIPTION OF THE PREFERRED EMBODIMENTS

FIG. 2 shows a memory card 210 having a buffer cache 212. Data is transferred between a host 214 and an NVM through the buffer cache 212. The NVM 220 may be a flash EEPROM or other similar memory used for data storage. The memory card 210 has a host interface 222 that allows the memory card 210 to be removably connected to a host system such as a camera, PC or phone. The memory card 210 has an NVM interface 224 between the buffer cache 212 and the NVM 220. The NVM interface 224 comprises circuitry that facilitates exchange of data between the buffer cache 212 and the NVM 220. A Central Processing Unit (CPU) 230 controls data operations within the memory card 210. Software in the CPU 230 implements operations in response to commands sent by the host 214. For example, if the host 214 requests data having a particular logical address range, the CPU 230 determines the location of the data in NVM 220 and carries out the necessary steps to retrieve that data and send it to the host 214. A CPU RAM 232 such as a Static Random Access Memory (SRAM) is used for storing data that is used by the CPU 230. Data in the CPU RAM 232 may be rapidly accessed by the CPU 230. Typically, data stored in CPU RAM 232 is data that is used frequently by the CPU 230.

Partitioned Cache

FIG. 3 shows a memory card 310, similar to memory card 210 but having a partitioned buffer cache 312. A partitioned memory, such as partitioned buffer cache in FIG. 3, has segments that may be operated separately according to different policies. Partitioned buffer cache 312 may be partitioned through software in the CPU or through hardware automation. The buffer cache 312 shown in FIG. 3 is partitioned into segments 1–4. Each segment may be used separately and each may have a different policy. The result is similar to having four separate buffer cache memories in parallel.

A table in CPU RAM 332 maintains a table 333 of characteristics of the buffer cache 312. A separate table entry is maintained for each segment in the buffer cache 312. An entry has fields that give the physical location of the segment in the buffer cache, the logical addresses of the data stored in the segment and the cache policy that is used for the segment. The size of a segment may be modified according to requirements. A change in size would change the physical address range allocated for a particular segment. Partitioning may be achieved through hardware also. However, such partitioning is not easily modified and is more difficult to implement than software partitioning.

A partitioned buffer cache such as partitioned buffer cache 312 may be larger in size than a conventional (non-partitioned) buffer cache. The size of a conventional buffer cache is generally determined by the maximum amount of data to be stored in order to achieve some performance threshold. In non-caching architectures, the buffer cache size is typically 8–16 kB. In a partitioned cache, it may be desirable to have a single segment act as a write cache and thus the overall size of the buffer cache would need to be larger. A buffer size of 32 kB or larger may be used.

Cache policies that may be implemented in a buffer cache, or a segment of a buffer cache, include both read and write cache policies. Read look-ahead is one example of a read cache policy. Write-through and write-back are examples of write cache policies. A segment of buffer cache may also be used by a CPU to maintain data used by the CPU. This may include data that are normally stored in the CPU RAM. CPU data stored in buffer cache may include program variables, address translation information and copy buffers. CPU data stored in buffer cache may be data that are stored in CPU RAM in some prior art examples. Providing a segment of buffer cache for CPU data provides an alternative location for storing this data that may be used in addition to CPU RAM.

Read Look-Ahead

A buffer cache may be used as a read cache that holds data that is being transferred from NVM to a host. A read cache may be the entire buffer cache or may be a segment of the buffer cache if it is partitioned. A read-look-ahead (RLA) cache allows data that may be requested by a host to be stored in cache before a request is actually made by the host for that data. For example, where a host requests data having a particular logical address range, additional data having a logical address range that is sequential to the requested data may be stored in an RLA cache. Because a host frequently requests data that is logically sequential to the last requested data, there is a high probability that the stored data will be requested. RLA data may also be selected in other ways based on host data usage patterns. If the cached data is subsequently requested, it may be transferred directly from the RLA cache to the host without accessing the NVM. This transfer is quicker than a transfer from NVM and does not use the NVM bus. Thus, the NVM bus may be used for other operations while data is being transferred to the host.

FIGS. 4A–4D show an example of the operation of an RLA cache. FIG. 4A shows RLA cache 412 in communication with a host 414 through a host bus 425. RLA cache 412 is also in communication with NVM 420 through an NVM bus 421. The host 414 requests a portion of data that consists of sectors 0–2. In this example, the data is stored in sectors, a sector being addressable by a logical address. In other examples, data may be stored in other addressable data units. The RLA cache 412 is empty so sectors 0–2 must be transferred from NVM 420. FIG. 4B shows sectors 3–7 being transferred from NVM 420 to the RLA cache 412 with sectors 0–2. FIG. 4C shows sectors 0–2 being transferred from RLA cache 412 to the host 414. Transfer of sectors 0–2 from RLA cache 412 to the host 414 frees space in RLA cache 412 so that three more sectors may be stored there. Therefore, sectors 8–10 are transferred from NVM 420 to fill the RLA cache 412. FIG. 4D shows a second request being received from the host 414. This request is for sectors 3–8. Thus, all the requested sectors of the second request are present in the RLA cache 412. Because sectors 3–8 are in RLA cache 412, access to NVM 420 is not required and sectors 3–8 may be directly transferred from RLA cache 412 to the host 414. If the second request was for sectors that were not in RLA cache 412 then the requested sectors would have to be retrieved from NVM 420.

In one implementation of an RLA cache for a flash memory, two processes are used to manage the RLA cache. One, the host command handling process of FIG. 5, handles host commands. The other, the flash access management process of FIG. 6, handles the RLA operation.

FIGS. 5, 6A and 6B show three related processes that are used to implement RLA operations. FIG. 5 shows a Host Command Handling Process that is responsible for the transfer of sectors of data from the RLA cache (Read cache) to the host. Where a new command is received it is first determined if it is a read command 510. If it is not, then the command is executed 512 without RLA operations. For a read command, if it is determined that a requested sector is not in read cache 514, the process waits for it to be transferred from flash to the read cache 516. Once the requested sector is in read cache, it is transferred to the host 518. If more sectors are to be read 519 then the process repeats this sequence for subsequent sectors. Thus, this process keeps transferring requested sectors from read cache to the host until all requested sectors have been transferred.

FIGS. 6A and 6B show the processes that are responsible for transferring sectors from flash to read cache. FIG. 6A shows a Host Interrupt Process. A host command generally invokes both the Host Command Handling Process of FIG. 5 and the Host Interrupt Process of FIG. 6A. The main purpose of the Host Interrupt Process of FIG. 6A is to queue interrupting host commands in the command queue for the Flash Access Management Process of FIG. 6B. If it is determined that the host command is not a read command 620, the command is put in the command queue for the Flash Access Management Process 622. The command queue may hold one or more commands. If the host command is a read command then an Adjust Read Command step is performed 624. Adjust Read Command step 624 modifies the read command that is used to access flash memory according to whether some or all of the requested sectors are present in read cache. Where no requested sectors are present in read cache, the read command is not modified because all sectors must be read from flash. Therefore, the unmodified command is placed in the command queue. Where some requested sectors are present in read cache, the read command is modified so that only sectors not present in read cache are requested from flash. Thus, the Adjust Read Command step 624 subtracts the sectors already in read cache from the read command before it is placed in the command queue. Where a full cache hit occurs (all requested sectors in read cache) 626, no access to the flash memory is needed because all sectors may be directly read from the read cache. In this case, the starting LBA for RLA operations is updated to identify a new set of RLA sectors to be stored in read cache 628.

FIG. 6B shows a Flash Access Management Process that is responsible for transferring sectors of data from flash to read cache. When a new command is received from the Host Interrupt Process, if that command is a write command then the read cache is invalidated 630 and the command is executed 632. If the command is a read command then an Adjust Read Command is performed as part of step 634 as described above with respect to Adjust Read Command step 624. An Adjust Read Command step is repeated in the Flash Access Management Process because a sector could be present in read cache at this point that was not present when the Adjust Read Command step 624 was performed as part of the Host Interrupt Process. For example, the transfer of a sector from flash to read cache could be completed in the time period between steps 624 and 634. Any requested sectors that are not in read cache are read from flash and a start LBA is set so that unrequested data starting at that LBA may be loaded into read cache in the look-ahead portion of the process flow as part of step 634. If there is an RLA sector in data cache 636 and there is space available in buffer cache for it ("host buffer available") 638, the sector is transferred from data cache to read cache 640. If there are additional sectors in data cache and the number of sectors in the buffer cache is less than the prefetch length N (the predetermined number of sectors that are to be loaded in buffer cache) 642, the cycle is repeated. If a new command is received 644, the cycle is stopped so that the new command may be executed. If no more sectors remain in data cache 642 and there are less than N sectors in read cache 644, a read is performed to transfer data from the flash memory array to the data cache 646 and then the cycle is restarted. When the number of sectors in read cache reaches the prefetch number N 644, the process waits for the number of sectors in read cache to decrease to less than N at step 648. This occurs if sectors in read cache are transferred to the host. If a new command is received at this point 630, the new command is executed. When the number of sectors in read cache drops below N 648, new RLA sectors are transferred to read cache from data cache 652 if present there, or otherwise from the flash memory array to data cache 646 and then to read cache 640.

An RLA operation in progress may be stopped where the RLA operation reaches a predetermined limit, or because of another operation being carried out. Where a memory array has zones that require creation of new address translation tables, an RLA operation may be stopped at metablock boundary that requires creation of such new tables. An RLA operation may be stopped when an operation with long latency is needed. For example, when an ECC error occurs that requires software intervention, an RLA operation may be stopped. The data containing the error should be excluded from cache. When any new command is received RLA operations may be aborted so that the new command may be executed immediately. RLA operations are also stopped when the desired number of sectors are in cache.

Examples of Read-Look-Ahead

The following examples show how an RLA cache may be used where a request for data is received. These examples are based on flash memory that uses a metapage that contains 8 sectors of data. A flash 703 has a data cache that holds 8 sectors which is equal to the amount of data in one metapage of flash 703. A controller 705 has a 16-sector buffer cache 707 and a prefetch length of 16. The buffer cache 707 has cache unit 0 and cache unit 1, capable of holding 8 sectors each, as shown in FIG. 7. Thus, a buffer cache unit holds the same amount of data as one metapage of NVM. One cache unit is designated as the current cache unit at any time. The following terms are used in the examples shown.

| | |
|---|---|
| read N M: | Read M sequential sectors starting at LBA N |
| host-to-buffer xfer: | Sector transfer from host to host buffer |
| host buffer full: | It indicates that the entire buffer space is full and host buffer cannot take any more data |
| card busy: | It indicates to host that the device (buffer or segment of buffer) is busy and cannot receive a command or data from host |
| buffer-to-flash xfer: | Sector transfer from host buffer to flash |
| read/busy(R/B): | Flash ready/busy |
| true ready/busy: | Flash true ready/busy |

FIG. 8A shows an example of RLA cache operation. The cache is empty at the beginning of this operation. When a request "read 0 1" is received from a host indicating that the host is requesting one sector with logical address 0, there is no data in cache. This is considered a cache miss. Sector 0 is transferred from flash to the cache (buffer). Sector 0 is then transferred to the host. Sectors 1–7, are also transferred from flash to buffer cache as part of a first read operation to a first cache unit. Next, sectors 8–15 are transferred to a second cache unit as a second read operation. Then, sector 16 is transferred from cache. Space is available to store sector 16 because sector 0 has been transferred to the host. When a sector is transferred to buffer cache, a full metapage is generally read from the flash memory array to the data cache. A metapage may include sectors 16–23. Sectors 17–23 may remain in data cache after sector 16 is transferred to buffer cache. Thus, a request by the host for a single sector causes a RLA operation that stores 16 sectors in buffer cache and leaves a further 7 sectors in data cache.

When a second request "read 1 16" is received from the host indicating that the host is requesting 16 sectors with a starting logical address of 1 (sectors 1–16), these sectors are already present in cache and may be transferred directly to the host. While sectors 1–16 are being transferred to the host, additional sectors may be transferred from flash to cache as part of a second RLA operation.

FIG. 8B shows a similar example to that of FIG. 8A except that instead of a second request for 16 sectors, a series of requests are received, each for a single sector. When one of these sectors is transferred to the host, a sector is transferred from data cache to cache so that the cache remains full. Before the second request, "read 1 1," sectors 16–23 are stored in data cache. Thus, sectors 17–23 may be transferred to cache from data cache as sectors 1–7 are transferred from cache to the host. Because sectors 17–23 are in data cache, there is no need to access the flash memory array during this operation.

FIG. 8C shows a partial hit where only one sector of data requested by the host in the second request is present in cache. The first request is the same as in FIGS. 8A and 8B. However, the second request, "read 16 3," is for three sectors with a starting address of 16. Only one of the three sectors, sector 16, is present in cache. Sector 16 is transferred directly from cache to the host. The other two sectors, sectors 17 and 18, are read from data cache. The sectors stored in cache, sectors 1–15, are discarded and sectors 19–34 are transferred from flash as the new RLA sectors.

Write-Through Cache

A write-through cache may be implemented in a buffer cache such as the buffer cache shown in FIG. 2 or the partitioned buffer cache shown in FIG. 3. A write-through cache accepts data from a host and sends the data to NVM without modifying the data. The data may be sent to NVM as soon as it is received, provided that the NVM is ready to receive the data. For example, where a host sends a data stream, comprising multiple sectors of data, sectors may be written to NVM immediately. In the NVM, the data may be kept in data cache and programmed when required. By returning a signal to a host indicating that the data is written to NVM, when in fact it is not in NVM but in write-through cache, the apparent time to store data may be shortened. This allows the host to send subsequent data more rapidly. More data may be sent by the host without waiting for the previous data to be programmed into NVM. A memory card may transfer a first portion of data from write-through cache to NVM while simultaneously transferring a second portion of data from a host into write-through cache. A write-through cache may allow more efficient programming of the NVM. Sectors of data may be stored in write-through cache until enough data has been transferred by the host to allow a full metapage to be programmed using the maximum parallelism of the NVM array. This may allow programming to occur more rapidly because of increased parallelism and may further improve performance by reducing or avoiding any garbage collection required after programming.

Programming of data from write-through cache to NVM may be triggered by various events. The data may be programmed when sufficient data is present in write-through cache to use the maximum parallelism of the NVM. For an NVM that stores data in metablocks, this will be an amount of data equivalent to one metapage. Programming may also be triggered by receiving a sector that is not sequential to sectors already stored in cache. A sector may be regarded as sequential even though there is a gap between it and stored sectors if the gap is less than a certain predetermined amount. Certain host commands may trigger programming of data in write-through cache. In memory cards using the CompactFlash™ (CF) standard, commands triggering programming of data in write-through cache include Read Sectors, Flush Cache and Set Feature (if used for disabling write cache). Programming may also be triggered after a predetermined time. If the contents of cache have not been committed to NVM for the predetermined time, programming automatically occurs. Typically, the predetermined time will be in a 1 msec–500 msec range.

FIG. 9 shows an example, where single sector writes occur and an NVM 909 has an eight-sector metapage. Eight sectors, sectors 0–7, may be stored in write-through cache before being written to NVM 909. This may be quicker than individually storing the eight sectors in NVM. Instead of waiting for sector 0 to be programmed to NVM, a signal is sent indicating that sector 0 is programmed and the host sends sector 1 to the memory card. This is repeated until sectors 0–7 are stored at which time all eight sectors are programmed in parallel. Sectors 0–7 are transferred from Write Cache unit 0 to data cache and are then programmed in parallel to Metapage X in the memory array. Sectors may be transferred to data cache individually and then programmed to the memory array in parallel.

In contrast with the parallel programming of sectors to flash (NVM) shown in FIG. 9, some prior art systems only allow a single sector to be programmed into a multi-sector page where the single sector is individually received. With single sector programming to NVM, each sector may initially occupy a metapage of space in the array. Thus, each single sector write leaves unused space in the memory array that is sufficient to store seven sectors of data. Such sectors may later be consolidated to a single metapage as part of garbage collection so that the unused space is recovered. However, garbage collection operations require time and system resources and it is desirable to minimize the need for such operations.

FIG. 10 shows a series of single sector writes, followed by a read command being received from a host. Individual sectors are first sent to the write-through cache. When sector 7 is received it is immediately programmed to the NVM. While sector 7 is being programmed, sectors 8–16 are received from the host. Sectors 8–15 are programmed to the memory array after sector 7 is programmed. Sectors 8–15 form a metapage of the memory array. Sector 16 is held in write-through cache. Next, a read command, "read 7 1," is received. After sector 16 is written to the memory array, the read command is executed.

FIG. 11 shows pipelining of host-to-buffer cache and buffer cache-to-NVM data transfers. As long as the NVM is ready to receive data, previously received sectors from the host may be programmed in NVM while new sectors are stored in write-through cache. A stream of sectors of data is sent by a host to a buffer as indicated by stream "A." The sectors are individually transferred to NVM, as indicated by sectors "B." In NVM they are programmed from data cache to the memory array in parallel in units of a metapage. Sectors are transferred from a host to the buffer cache in parallel with programming other sectors to the memory array. However, programming to the memory array takes longer than transferring from the host. FIG. 11 shows Tgap, the time delay caused by programming of data to the memory array. Tgap is the time difference between the time to transfer eight sectors from the host to the buffer cache and the time to transfer eight sectors from the buffer cache to the memory array. In this example, programming takes 300 μsec but Tgap is less than 100 μsec. Thus, the delay caused by programming time is reduced from 300 μsec to less than 100 μsec because of pipelining.

Write-Back Cache

A write-back policy may be implemented in a buffer cache or a segment of a buffer cache. A write-back cache policy allows data from a host to be modified while in cache without being written to NVM. This reduces use of the NVM and the NVM bus. Data is not written to NVM until certain conditions are met that force the data out of cache. While data is in cache it may be updated one or more times without doing a program operation to NVM. This may save time and also reduce the amount of garbage collection needed.

FIG. 12 shows a flowchart for a write cache operation using a write cache that has two units that each hold data equivalent to data held in a metapage of the memory array. One write cache unit is designated as the current write cache unit at any time. When data is received from a host, the current write cache unit is first checked to see if it is valid ("cache valid")1210. The current write cache unit is valid if it contains data that has not been written to NVM. If the current write cache unit is not valid then the received data is written in the current write cache unit and is copied to data cache in the NVM but is not programmed to the memory array 1212. If the current write cache unit is valid then the received data is compared with the data in cache to see if there is a "cache hit," 1214. A cache hit occurs where the received data replaces data that is stored in cache or is sequential to data stored in cache. When a cache hit occurs, the received data is entered into the current write cache unit 1216. When a "cache miss" occurs (received data does not replace and is not sequential to data in cache), the current write cache unit is committed to the memory array 1218 (if not already committed) and the new data is stored in a write cache unit that is designated as the current write cache unit 1212.

When a sector is stored in the current write cache unit, if the sector causes the current write cache unit to become full 1220, then the current write cache unit is programmed to flash 1222. The buffer cache is then free to accept new sectors of data from the host.

Session Command

Some of the above embodiments keep data in buffer cache that is not stored elsewhere in the memory card. A buffer cache is generally a volatile memory so that data stored in buffer cache is lost when power is removed. In a removable memory card that gets its power from a host, the memory card may be unable to keep data in volatile memory because power may be lost. Even where a group of transactions are part of a host session and power is maintained for the session, the memory card may not recognize that the transactions are linked. A transaction consists of an exchange between the host and the memory card that is initiated by a host command, for example a command to read certain sectors followed by the memory card transferring those sectors. Because the card does not recognize that the transactions are linked it is unable to use the time between transactions and the card may not carry out certain operations because power might be lost. Such operations may include background operations such as caching operations, garbage collection and address translation information updates. It is important that the data that is not stored in NVM, including data in the process of being stored in NVM and data in a buffer cache or in CPU RAM, is not lost due to loss of power. A host may guarantee power to a memory card and thus enable use of the buffer cache or other volatile memories for otherwise unsaved data. Such a guarantee of power may also allow operations to be more efficiently scheduled because a significant portion of time may be available for performing operations allowing greater flexibility in scheduling them. For example, garbage collection operations may be scheduled for a time when they will have reduced impact on host data write operations. Operations may be scheduled so that they are carried out as background operations and thus cause little or no disruption to other operations.

In one embodiment, the host may issue a session command (e.g. "SESSION_START") that indicates that multiple card transactions are part of the same session and that power will be maintained at least until the end of the session, thus allowing data caching or other background operations during the transactions and in the time between transactions. The session command indicates a guarantee of power by the host for the duration of the session. This allows the card to carry out certain operation using volatile memory for the duration of the session. The session may be ended by a session-end command (e.g. "SESSION_END"). A "SESSION END" command may disable data caching because the power supply is no longer guaranteed. A session command may identify the logical address at which the transactions in the session begin, the number of blocks in a transaction, the data transfer rate and other host profiling information. A memory card may schedule background operations that use volatile memory so that they occur between transactions of a session.

In another embodiment, streaming commands are used to optimize the transfer of streams of data to and from the memory card. A "CONFIGURE STREAM" command from a host may enable caching of streaming data in the memory card. A "CONFIGURE STREAM" command may also define the properties of a stream of data so that the caching may be optimized for the particular stream. The "CONFIGURE STREAM" command may specify a command completion time for a stream of data. Additional streaming commands may include a command that requires the cache to be flushed to the NVM. A separate command may enable caching for all data (including non-streaming data). Streaming commands may allow caching to be used for streaming data even where caching is not enabled for all data.

The above description details particular embodiments of the invention and describes embodiments of the invention using particular examples. However, the invention is not limited to the embodiments disclosed or to the examples given. It will be understood that the invention is entitled to protection within the full scope of the appended claims.

The invention claimed is:

1. A removable memory card for storing data in a non-volatile, non-rotating storage medium, comprising:
   a host interface;
   a non-volatile memory array; and
   a buffer cache in communication with the host interface and the non-volatile memory array, the buffer cache having at least a first portion and a second portion for storing data, the first portion having a first policy, the second portion having a second policy, the first policy and the second policy being separately selected.

2. The removable memory card of claim 1 wherein the first policy is a write-through cache policy.

3. The removable memory card of claim 1 wherein the first policy is a write-back cache policy.

4. The removable memory card of claim 1 wherein the first portion functions as a read cache such that when a first group of data that is stored in the non-volatile memory array is requested, the first group of data and a second group of data that is not requested are read from the non-volatile memory array and the second group of data is stored in the first portion.

5. The removable memory card of claim 1 wherein the first portion is used to store data that is used by a central processing unit that is not part of a data stream.

6. The removable memory card of claim 1 wherein the first portion and the second portion are segments of a segmented cache.

7. The removable memory card of claim 1 further comprising a third portion having a third policy and a fourth portion having a fourth policy.

8. The removable memory card of claim 7, further comprising a central processing unit, wherein the first policy is a write-through policy, the second policy is a write-back policy, the third policy is a read cache policy and the fourth policy is a central processing unit data storage policy.

9. The removable memory card of claim 1 wherein the size of the first portion may be modified.

10. The removable memory card of claim 1 wherein the size of the first portion may be modified during operation of the card in response to host command sequences.

11. The removable memory card of claim 1 further comprising a central processing unit that controls the operation of the buffer cache.

12. A removable memory card for storing data in a non-volatile, non-rotating storage medium, comprising:
    a host interface for connecting to a host;
    a non-volatile, non-rotating memory array; and
    a read-look-ahead cache interposed between the host interface and the non-volatile, non-rotating memory array, the read-look-ahead cache storing a non-requested portion of data that is sequential to a requested portion of data requested by the host.

13. The removable memory card of claim 12 wherein the read-look-ahead cache is a segment of a segmented buffer cache.

14. The removable memory card of claim 12 wherein the non-requested portion of data is the maximum amount of data that may be stored in the read-look-ahead cache.

15. The removable memory card of claim 12 further comprising a central processing unit that controls the read-look-ahead cache and a static random access memory connected to the central processing unit.

* * * * *